(No Model.)

E. A. COLLINS.
ICE TONGS.

No. 339,044. Patented Mar. 30, 1886.

WITNESSES:

INVENTOR:
E. A. Collins
BY Munn & Co
ATTORNEYS.

UNITED STATES PATENT OFFICE.

ELI A. COLLINS, OF HUNTINGTON, INDIANA, ASSIGNOR TO HIMSELF AND CYRUS E. BRYANT, OF SAME PLACE.

ICE-TONGS.

SPECIFICATION forming part of Letters Patent No. 339,044, dated March 30, 1886.

Application filed September 3, 1885. Serial No. 176,077. (No model.)

*To all whom it may concern:*

Be it known that I, ELI A. COLLINS, of Huntington, in the county of Huntington and State of Indiana, have invented certain new and useful Improvements in Ice-Tongs, of which the following is a full, clear, and exact description.

This invention consists, first, in the peculiar construction of the prongs and handles in ice-tongs, so that when closed the handles will be at a distance apart to prevent injury to the hands; second, in forming the handles separate from the prongs with straps and slots to be secured to the prongs in any convenient manner.

Reference is to be had to the accompanying drawings, forming a part of this specification, in which similar letters of reference indicate corresponding parts in all the figures.

Figure 1:
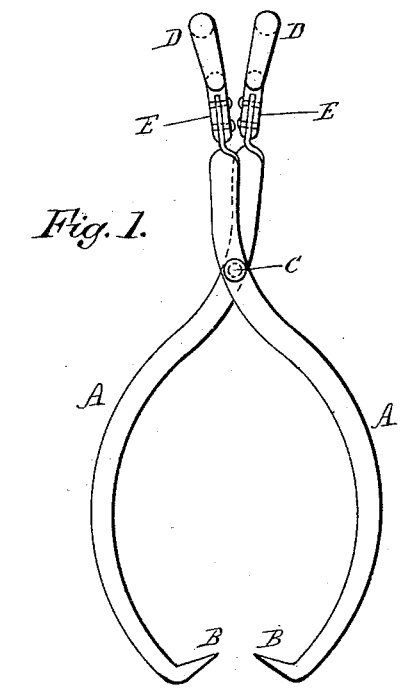
Figure 2:
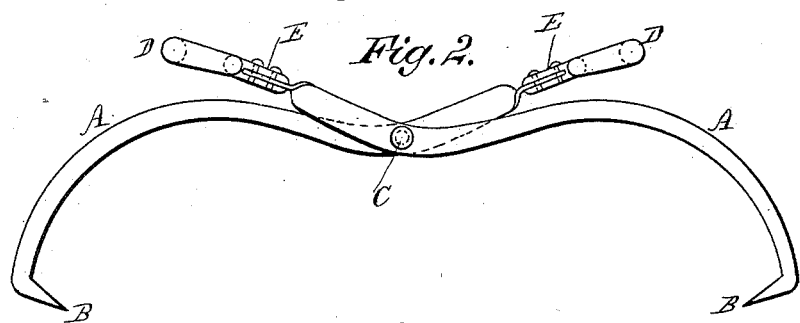
Figure 3:
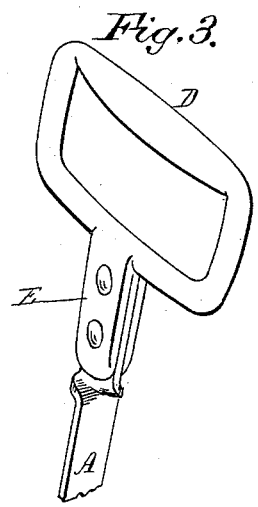

Figure 1 represents a side elevation of a pair of ice-tongs closed having my improvements applied thereto. Fig. 2 is a pair of tongs opened, or their prongs spread apart to their extreme. Fig. 3 is a perspective view of one handle on an enlarged scale secured by rivets to the upper side of a fragment of a prong, showing a quarter-twist near the end of the prong to receive the handle at right angles thereto, as hereinafter to be described.

A in the accompanying drawings represents the two prongs in a pair of ice-tongs, with hooks B of the usual form, and which are pivoted at C. To the upper ends of these prongs A are secured the two handles D, which are made separately from the prongs and riveted thereto, as shown. From the lower sides of these handles project straps E, with spaces between them of sufficient width to receive the upper ends of the prongs A, as shown in the several figures.

In order that the handles and prongs may be properly secured to each other, the prongs, near their upper ends, have a quarter-twist, so that the handles may set at right angles to the movement of the prongs, and when closed without a piece of ice between them the straps E, which are of sufficient thickness, will form shoulders to hold the handles apart to protect the hand, as represented in Fig. 1.

An economical and convenient manner of making the handles is to cast them and subsequently render the castings malleable. Handles so made are cheap and durable, and may be riveted to the prongs without danger of breaking.

Having thus described my invention, I claim as new and desire to secure by Letters Patent—

1. As a new and improved article of manufacture, a pair of ice-tongs constructed substantially as herein described, consisting of the prongs A, having a quarter-twist near their upper ends, and provided with independent handles secured thereto, as and for the purpose set forth.

2. In a pair of ice-tongs, the independent handles D, with straps E, and spaces between the straps to receive the ends of the prongs to be secured thereto, substantially as herein described.

ELI A. COLLINS.

Witnesses:
JOSEPH F. BUCHANAN,
CHARLES B. GARRETT.